US012641155B2

(12) United States Patent

Gomiero et al.

(10) Patent No.: US 12,641,155 B2

(45) Date of Patent: May 26, 2026

(54) SYSTEM AND METHOD FOR SUPPORTING ACTIVITIES IN A SHIPYARD DURING THE CONSTRUCTION OF A SHIP

(71) Applicant: Fincantieri S.p.A., Trieste (IT)

(72) Inventors: Giorgio Gomiero, Trieste (IT); Tharsis Pilutti Namer, Trieste (IT); Simon Luca Bristot, Trieste (IT); Simon Oliver Blieck, Trieste (IT); Riccardo Tomassoni, Trieste (IT); Tristano Loseto, Trieste (IT); Alessio Ghiggeri, Trieste (IT); Francesco Ziparo, Trieste (IT); Roberto Capato, Milan (IT); Massimo Momi, Milan (IT); Dario Bottazzi, Bologna (IT)

(73) Assignee: Fincantieri S.P.A., Trieste (IT)

( * ) Notice: Subject to any disclaimer, the term of this patent is extended or adjusted under 35 U.S.C. 154(b) by 392 days.

(21) Appl. No.: 18/508,312

(22) Filed: Nov. 14, 2023

(65) Prior Publication Data

US 2024/0163339 A1 May 16, 2024

(30) Foreign Application Priority Data

Nov. 14, 2022 (IT) ........................ 102022000023412

(51) Int. Cl.
*H04L 67/12* (2022.01)
*B63B 73/00* (2020.01)
(Continued)

(52) U.S. Cl.
CPC .............. *H04L 67/12* (2013.01); *B63B 73/00* (2020.01); *G06Q 50/08* (2013.01); *G08B 19/00* (2013.01);
(Continued)

(58) Field of Classification Search
CPC . H04L 67/12; H04L 41/0213; H04L 65/1104; H04L 12/44; H04L 41/0809;
(Continued)

(56) References Cited

U.S. PATENT DOCUMENTS

| | | | | |
|---|---|---|---|---|
| 12,024,201 B2 * | 7/2024 | Chakraborty | .......... | G05D 1/101 |
| 2016/0239743 A1 | 8/2016 | Hwang et al. | | |

(Continued)

FOREIGN PATENT DOCUMENTS

| | | |
|---|---|---|
| CN | 112722192 A | 4/2021 |

OTHER PUBLICATIONS

Italian Search Report for Italian Patent Application No. 2022000023412 dated Jun. 7, 2023, Munich, DE.

(Continued)

*Primary Examiner* — Rami R Okasha

(74) *Attorney, Agent, or Firm* — ArentFox Schiff LLP; Michael Fainberg

(57) ABSTRACT

A system for supporting activities in a shipyard during construction of a ship has at least one local electronic computer installed in a watchtower of the ship and operatively connected to at least one central electronic computer remote from the ship, a first plurality of electronic apparatuses operatively connected by respective wired connection backbone cables to form one or more tree network topologies, each electronic apparatus representative of a root node of a respective tree network topology being operatively (Continued)

connected to the at least one local electronic computer, and a plurality of sensors adapted to detect information representative of the shipyard and operatively connected by respective wired connection cables to form one or more network topologies from one or more electronic apparatuses. Each electronic apparatus is configured to manage network connectivity and safety of the shipyard based on the information representative of the shipyard detected by the plurality of sensors.

17 Claims, 9 Drawing Sheets

(51) Int. Cl.

| | |
|---|---|
| *G06Q 50/08* | (2012.01) |
| *G08B 19/00* | (2006.01) |
| *H04L 12/44* | (2006.01) |
| *H04L 41/0806* | (2022.01) |
| *H04L 41/12* | (2022.01) |

(52) U.S. Cl.
CPC .......... *H04L 12/44* (2013.01); *H04L 41/0809* (2013.01); *H04L 41/12* (2013.01)

(58) Field of Classification Search
CPC ......... H04L 41/12; B63B 73/00; G06Q 50/08; G06Q 10/08; G06Q 10/087; G06Q 50/04; G06Q 10/00; G08B 19/00; H04W 84/18
See application file for complete search history.

(56) References Cited

U.S. PATENT DOCUMENTS

| | | | |
|---|---|---|---|
| 2021/0082220 A1* | 3/2021 | Boerger ............. | B65G 69/2882 |
| 2021/0367840 A1* | 11/2021 | Cella ................... | H04L 41/0809 |
| 2023/0056132 A1* | 2/2023 | Cavanaugh ............. | G01B 7/18 |
| 2023/0295899 A1* | 9/2023 | Yamada ................. | G06Q 50/08 |
| | | | 701/2 |
| 2024/0330451 A1* | 10/2024 | Costin ................... | G06Q 50/16 |

OTHER PUBLICATIONS

Ang Joo Hock et al, Smart design for ships in a smart product through-life and industry 4.0 environment, 2016 IEEE Congress on Evolutionary Computation (CEC), Jul. 24, 2016, pp. 5301-5308, IEEE.

* cited by examiner

SYSTEM AND METHOD FOR SUPPORTING ACTIVITIES IN A SHIPYARD DURING THE CONSTRUCTION OF A SHIP

CROSS-REFERENCE TO RELATED APPLICATION

This application claims priority to Italian Patent Application No. 102022000023412 filed on Nov. 14, 2022, the contents of which are incorporated by reference in their entirety.

FIELD OF THE INVENTION

The present invention relates to the naval field, in particular to a system and method for supporting activities in a shipyard during the construction of a ship.

BACKGROUND OF THE INVENTION

Infrastructures supporting activities in a shipyard during the construction of a ship are known, which comprise communication apparatuses, sensors and other components installed and wired to one another ad hoc.

Such infrastructures provide connectivity for the communication between operators and allow managing emergencies and dangerous situations (e.g., fires) which can occur within the shipyard.

A major limitation of known infrastructures is linked to the fact that, as work progresses during the construction of the ship, the space within which the infrastructure must ensure support can change, making the infrastructure no longer functional.

For example, a previous opening into the ship can then be closed by a steel bulkhead.

It is apparent that, in this situation, the data communications which were previously possible through the opening may be hindered, if not completely interrupted, by the presence of the bulkhead.

Therefore, an existing infrastructure must be modifiable so as to ensure the same support services whenever required due to shipyard changes.

However, this requires time, thus increasing ship construction times and costs.

Therefore, the need is strongly felt to have an infrastructure for supporting activities in a shipyard during the construction of a ship which is capable of overcoming the constraints and rigidities of existing infrastructures, following new needs, introducing technologies capable of ensuring flexibility of use and ease of maintenance of the infrastructure for the long term, and improving various aspects of safety starting with the prevention of accidents.

SUMMARY

It is the object of the present invention to devise and provide a system for supporting activities in a shipyard during the construction of a ship which allows "at least partially" overcoming the drawbacks highlighted above with reference to the prior art.

In particular, it is the object of the present invention to devise and provide a system for supporting activities in a shipyard during the construction of a ship which is capable of overcoming the constraints and rigidities of existing infrastructures, adapting itself to new needs, introducing technologies capable of ensuring flexibility of use and ease of maintenance of the infrastructure for the long term, and also improving various aspects related to the safety within the shipyard, starting with the prevention of accidents.

Such an object is achieved by a system for supporting activities in a shipyard during the construction of a ship as described and claimed herein.

The present invention also relates to a related method for supporting activities in a shipyard during the construction of a ship.

BRIEF DESCRIPTION OF THE DRAWINGS

Further features and advantages of the system and the related method according to the present invention will become apparent from the following description of preferred embodiments thereof, given by way of non-limiting indication, with reference to the accompanying drawings, in which.

DETAILED DESCRIPTION

With reference to the Figures, 100 indicates as a whole a system for supporting activities in a shipyard during the construction of a ship, hereinafter also simply support system or system, according to the present invention.

"Shipyard" means the operative site which, upon obtaining a construction order, is used for the construction of a ship.

"Activities in a shipyard" means production activities within the shipyard during the construction of a ship.

"Supporting activities in a shipyard" means connectivity/data communication and detection of events within the shipyard to provide necessary services during the construction of a ship including, for example, an accident alarm service, a fire alarm service, a flood alarm service, and so on.

"Information representative of the shipyard", described below, means information of events detectable in the shipyard, such as the presence of individuals, fault detection, water detection, smoke detection, in general the detection of an emergency or an alarm, and so on.

Figure 1:
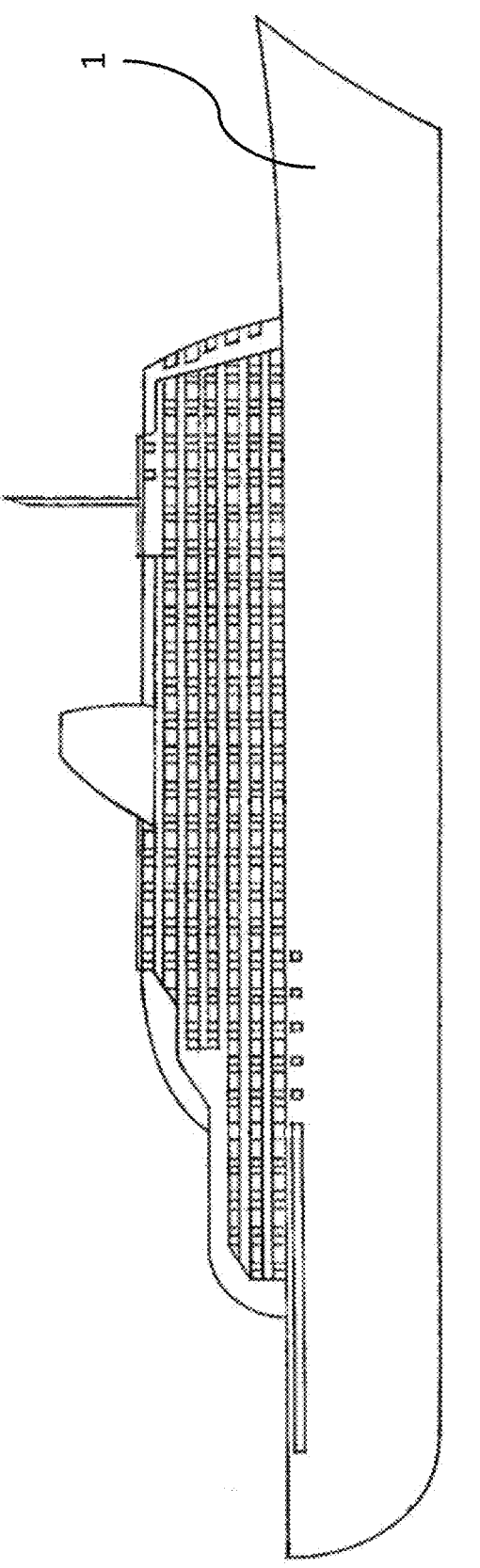
FIG. 1 diagrammatically shows an example of a ship in which a system and a related method for supporting activities in a shipyard during the construction of a ship can be used during the construction, in accordance with the present invention.

An example of a ship, indicated by reference numeral 1 as a whole, is shown in FIG. 1.

For the purpose of the present description, "ship" means any vessel usable for cruises, recreational and tourist service, for example a cruise ship, as shown in FIG. 1, or any other vessel, such as ships usable in the military field, merchant ships, work ships, etc.

With reference to FIG. 2, the system 100 comprises at least one local electronic computer 10 (server) configured to be operatively installed in the watchtower of the ship 1.

The at least one local electronic computer 10 is also called watchtower operations center and is configured to perform the functions of data collection, two-way Voice over IP communication (VoIP) with the operators working on the shipyard, message broadcasting, alarm reporting control.

The at least one local electronic computer 10 is configured to be operatively connected to at least one central electronic computer 20 remote from the ship 1.

The at least one central electronic computer 20 is, for example, a remote server.

The at least one central electronic computer 20 is, for example, a cloud server and is configured to perform the functions of data collection, displaying of possible alarms, reporting, two-way VoIP communication, and broadcasting of safety messages.

The at least one local electronic computer 10 is operatively connected to the at least one central electronic computer 20 by means of a wired connection, usually a wired IP connection, preferably with optical fiber.

Figure 2A:
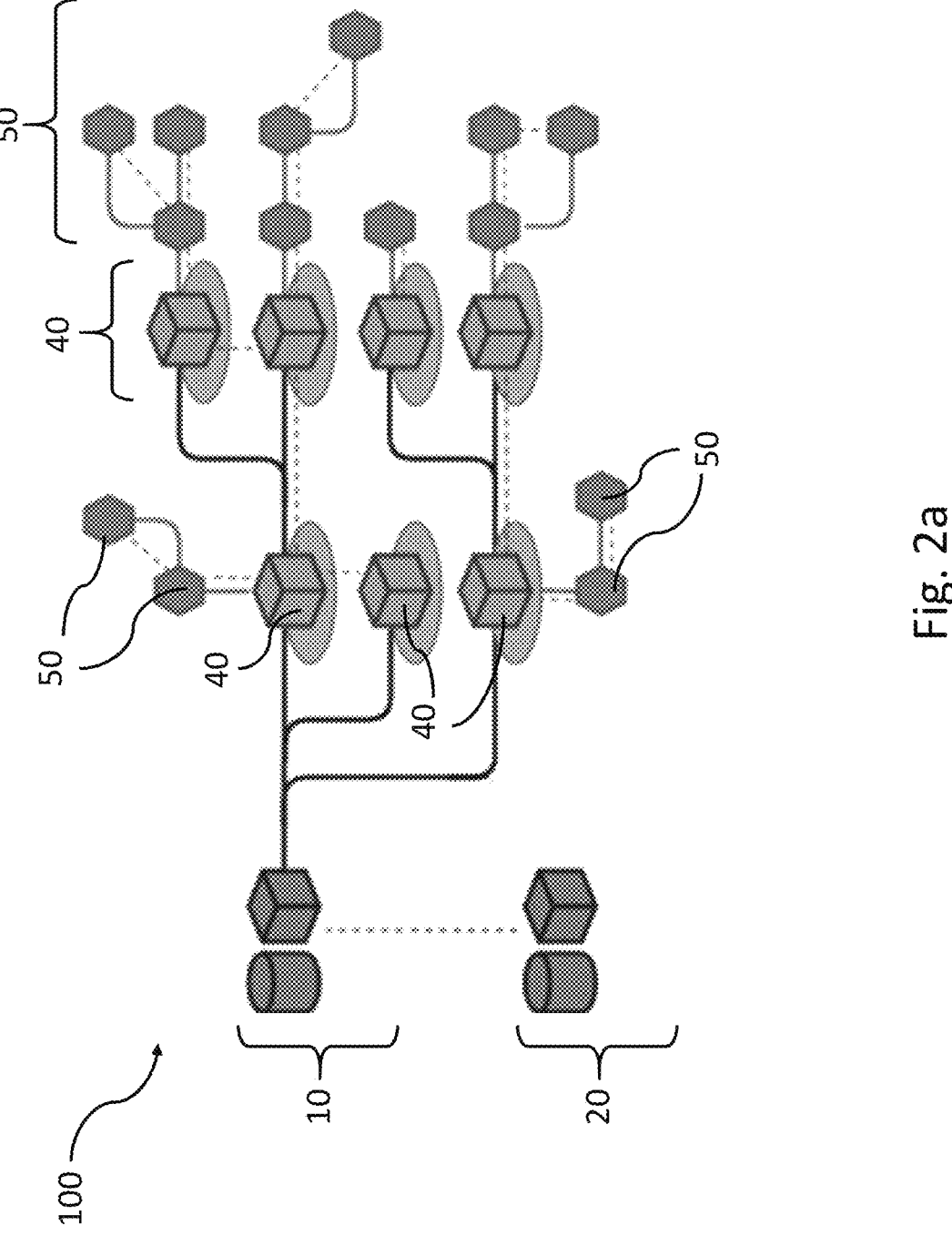
FIG. 2a shows, by means of a block diagram, a system for supporting activities in a shipyard during the construction of a ship according to an embodiment of the present invention.
Figure 2B:
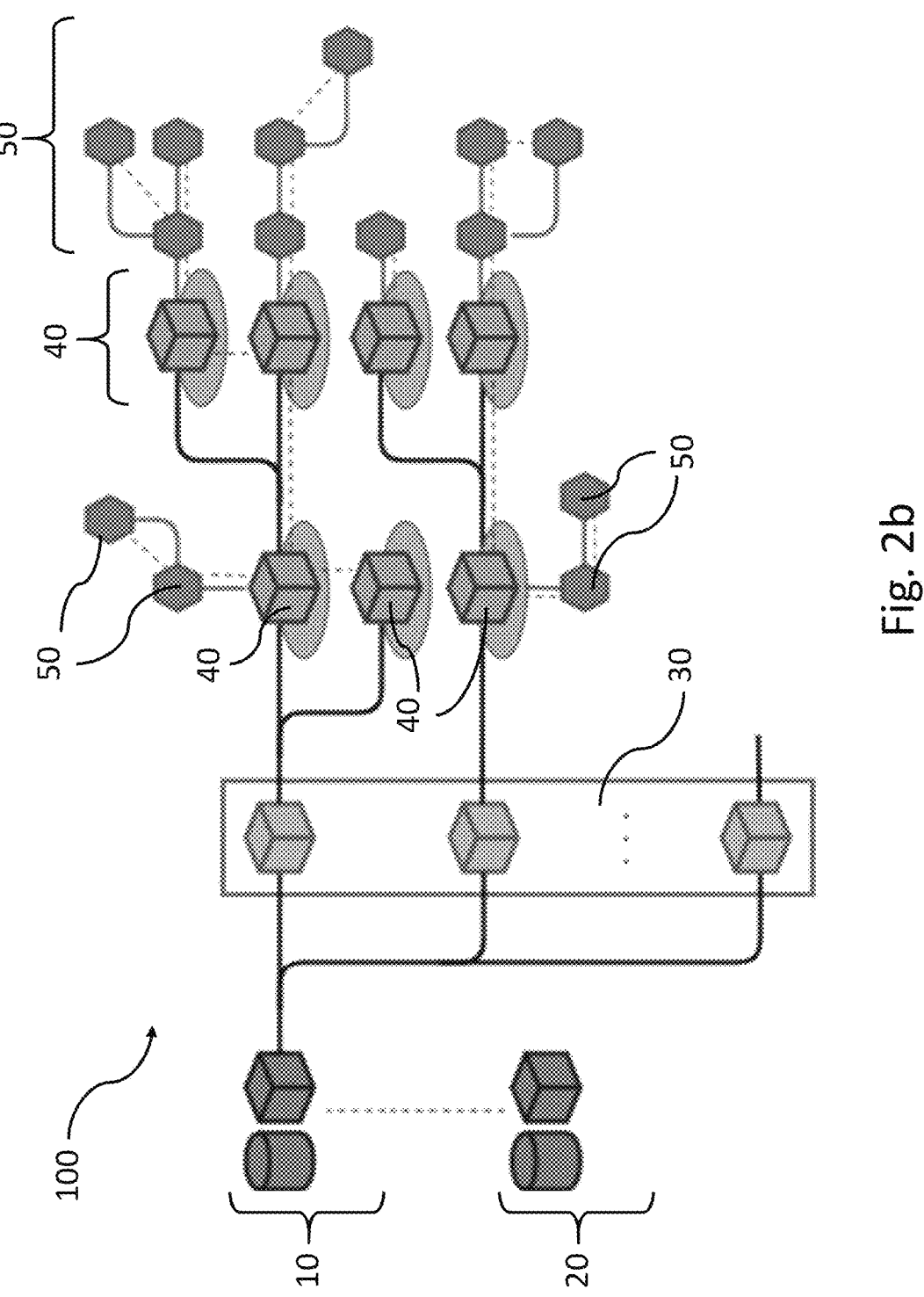
FIG. 2b shows, by means of a block diagram, a system for supporting activities in a shipyard during the construction of a ship according to an embodiment of the present invention.

With reference to FIGS. 2*a* and 2*b*, in accordance with the present invention, the system 100 comprises a first plurality 40 of electronic apparatuses operatively connected by respective wired connection backbone cables to form one or more tree network topologies, where each electronic apparatus 40 representative of a root node of the respective tree network topology is operatively connected to the at least one local electronic computer 10.

An electronic apparatus of the first plurality 40 of electronic apparatuses will be described in detail below.

The system 100 further comprises a plurality of sensors 50 adapted to be distributed in the shipyard (ship under construction) to detect information representative of the shipyard (ship under construction).

The definition of "information representative of the shipyard" has been indicated above.

The plurality of sensors 50 is operatively connected by respective wired connection cables to the first plurality 40 of electronic apparatuses to form one or more network topologies from one or more electronic apparatuses of the first plurality 40 of electronic apparatuses.

Examples of network topologies which can be formed by the plurality of sensors 50 are a star network topology (not shown in the Figures), a tree network topology (shown in FIGS. 2*a* and 2*b*).

If such a network topology is a tree network topology, the sensor 50 representative of a root node of the respective tree network topology is operatively connected to an electronic apparatus 40 of the first plurality 40 of electronic apparatuses.

The plurality of sensors 50 will be described in greater detail hereinbelow.

In accordance with the present invention, each electronic apparatus of the first plurality 40 of electronic apparatuses is configured to manage network connectivity and safety of the shipyard based on the information representative of the status of the shipyard detected by the plurality of sensors 50.

Figure 3:
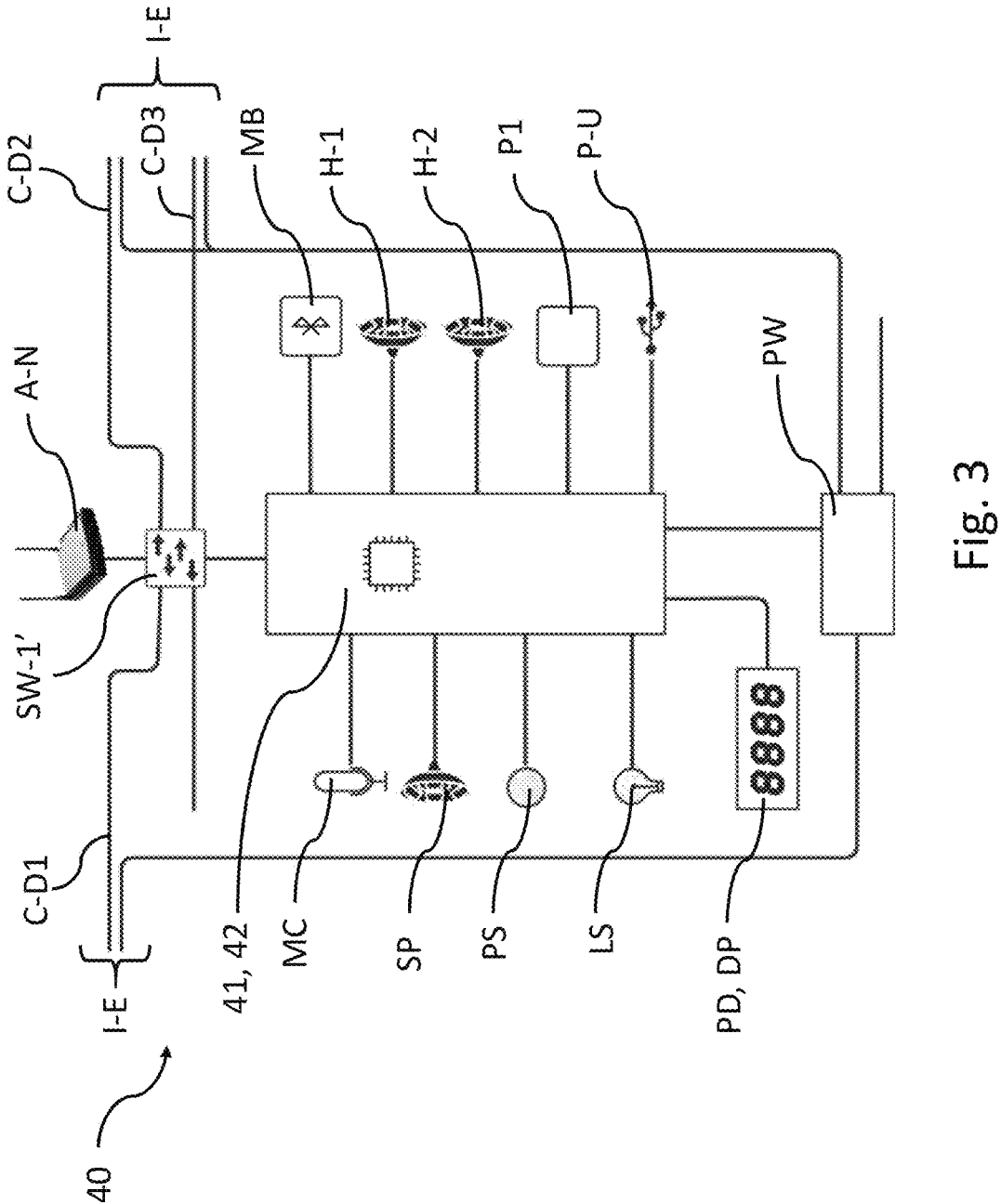
FIGS. 3 and 4 diagrammatically shows a further component of the system of FIGS. 2a and 2b in accordance with different embodiments.

With reference to FIG. 3, an electronic apparatus of the first plurality 40 of electronic apparatuses is now described.

The electronic apparatus 40 comprises a data processing unit 41, e.g., a microprocessor or a microcontroller.

The electronic apparatus 40 further comprises at least one memory unit 42 operatively connected to the data processing unit 41.

It should be noted that the at least one memory unit 42 is configured to store one or more program codes executable by the data processing unit 41 and data generated and processed after the execution of said one or more program codes.

The data processing unit 41 is configured to execute the operative functions delegated to the electronic apparatus 40.

In this respect, such operative functions comprise one or more of:

detecting data by the plurality of sensors 50 and communicating these data to the at least one local electronic computer 10 (watchtower of the ship 1);

detecting malfunctions of the system 100 and communicating these events to the at least one local electronic computer 10 (watchtower of the ship 1);

supporting emergency communication in a push-to-talk mode when requested by a worker on the shipyard;

supporting broadcast communication both vocally and by means of recorded messages;

supporting network connectivity; and detecting the presence of a physically close individual (e.g., a firefighter).

In accordance with an embodiment, in combination with any of the preceding ones, each electronic apparatus of the first plurality 40 of electronic apparatuses is configured to establish a wireless connection by a mesh network mechanism with the electronic apparatuses of the first plurality 40 of electronic apparatuses and the sensors of said plurality of sensors 50, directly connected thereto by means of the respective wired connection backbone.

A mesh network is a data communication network of the wireless type in which connectivity is based on the mutual proximity of the network nodes which collaborate for routing the data packets.

The organization of a mesh network is not pre-configured a priori, but the network nodes are configurable so as to provide connectivity to the users.

In accordance with a further embodiment, in combination with any one of those described above, each electronic apparatus of the first plurality 40 of electronic apparatuses is configured to allow a connection and a configuration of the plug-and-play type within the system 100.

As for the hardware, the electronic apparatus 40 comprises a dedicated Printed Circuit Board (PCB).

The architecture of such a PCB includes the integration of a System On a Module, SOM, processing module which implements the basic functions required for processing by the data processing unit 41.

In particular, the SOM processing module is itself a simple computer and has an adequate level of computational power to allow the execution of an operating system, e.g., a Linux Embedded system.

With reference again to FIG. 3, the electronic apparatus 40 comprises:

a microphone module MC operatively connected to the data processing unit 41;

a speaker module SP operatively connected to the data processing unit 41;

an inner horn H-1 (e.g., with a power of 10 W) operatively connected to the data processing unit 41; and an outer horn H-2 (e.g., with a power of 30 W) operatively connected to the data processing unit 41.

The aforesaid components are controlled by a sound card, operatively connected to the data processing unit 41, having the required power electronics.

Again with reference to FIG. 3, the electronic apparatus 40 further comprises:

an electrical supply unit PW operatively connected to the data processing unit 41, the electrical supply unit PW being electrically connectable to the electrical supply network;

an emergency button PS (e.g., "mushroom-shaped") operatively connected to the data processing unit 41;

an emergency light LS operatively connected to the data processing unit 41;

an outlet port PD operatively connected to the data processing unit 41 for the connection of a display DP capable of showing information representative of the electronic apparatus 40 (e.g., identifier, connectivity status, IP address, list of detection identifiers/time-stamps of an individual, such as a firefighter who passed nearby, and so on);

a first inlet port P1 operatively connected to the data processing unit 41 for the connection of one or more sensors of the plurality of sensors 50;

one or more ports of the USB type P-U operatively connected to the data processing unit 41;

a wireless communication module MB operatively connected to the data processing unit 41, for example for Bluetooth technology communication, the wireless communication module MB being configured to detect beacons or Bluetooth peripheral devices;

at least one first network switching module SW-1' operatively connected to the data processing unit 41 and adapted to receive as input and bring as output a connection backbone cable C-D;

a Wi-Fi communication access point A-N operatively connected to the at least one first network switching module SW-1';

one or more connection backbone cable interfaces I-E operatively connected to the at least one first network switching module SW-1'.

In accordance with an embodiment, in combination with any one of those described above and shown in FIGS. 3 and 4, it should be noted that, for the connection of a tree network topology, each electronic apparatus of the first plurality 40 of electronic apparatuses comprises an input connection to receive a respective connection backbone cable C-D1 and two output connections from each of which a respective further connection backbone cable departs, indicated in FIGS. 3 and 4 with C-D2 and C-D3, for the connection of other electronic apparatuses of the first plurality 40 of electronic apparatuses.

The electronic apparatus 40 is also adapted to output the electrical supply A-E received as input.

The electronic apparatus 40 is configured to be operatively connected to other electronic apparatuses of the first plurality 40 of electronic apparatuses by the one or more connection backbone cable interfaces I-E.

Figure 4:
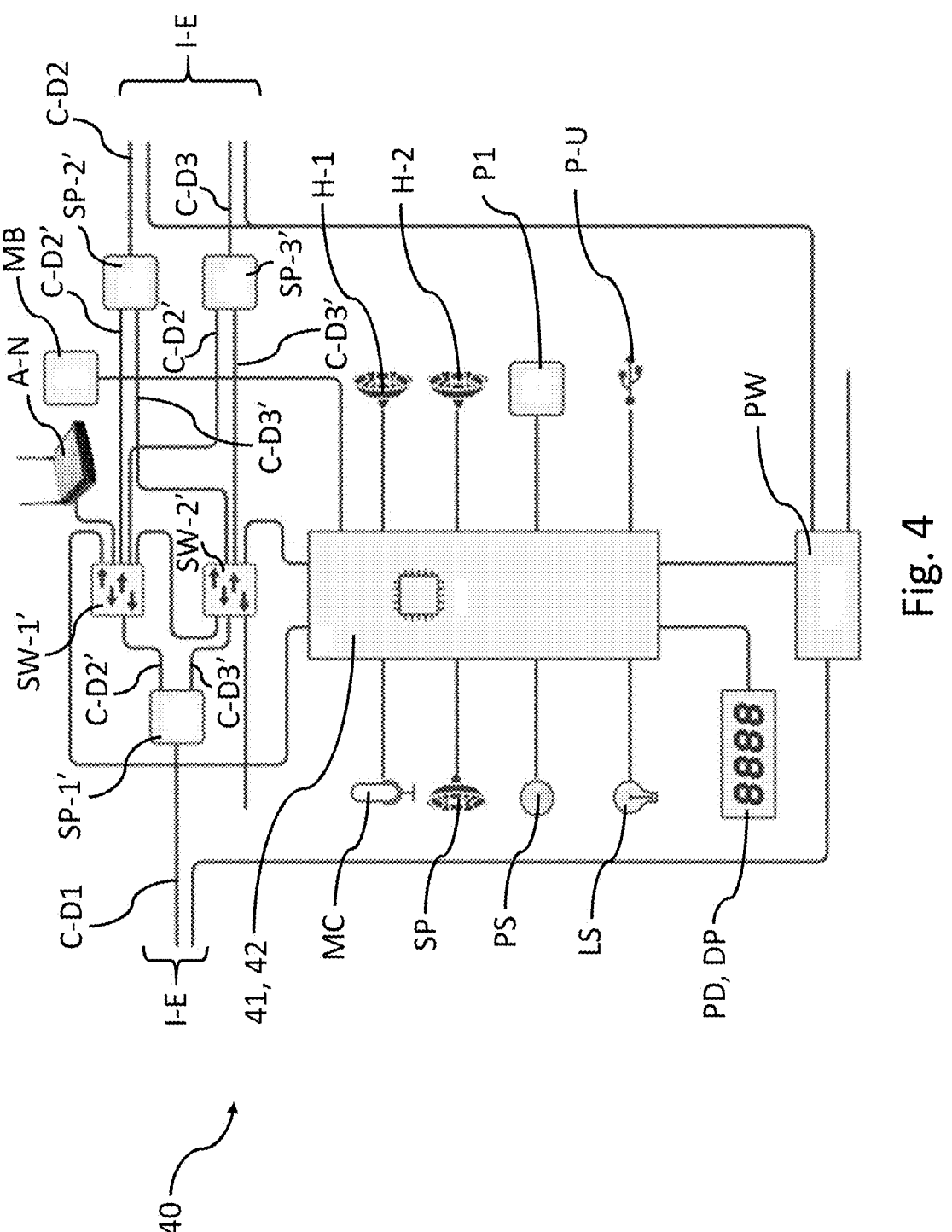

In accordance with a further embodiment, shown in FIG. 4, the electronic apparatus 40 comprises, in addition to the at least one first network switching module SW-1', a second network switching module SW-2' operatively connected to the at least one first network switching module SW-1'.

In one embodiment, the second network switching module SW-2' may be operatively connected to the at least one first network switching module SW-1' in a stacked mode.

In one embodiment, the electronic apparatus 40 further comprises:

an input splitter SP-1' adapted to receive the connection backbone cable C-D1 as input and to bring a first connection backbone cable C-D2' as input to the at least one first network switching module SW-1' and a second connection backbone cable C-D3' as input to the second network switching module SW-2';

a first output splitter SP-2' adapted to receive the first connection backbone cable C-D2' from the at least one first network switching module SW-1' and the second connection backbone cable C-D3' from the second network switching module SW-2' as input, and to bring the further connection backbone cable C-D2 as output;

a second output splitter SP-3' adapted to receive the first connection backbone cable C-D2' from the at least one first network switching module SW-1' and the second connection backbone cable C-D3' from the second network switching module SW-2' as input, and to bring the further connection backbone cable C-D3 as output.

In this embodiment the electronic apparatus 40 is also adapted to output the electrical supply A-E received as input.

This embodiment has the advantage that the data communication by the electronic apparatus 40 is also possible when one of the at least one first network switching module SW-1' and the second network switching module SW-2' fails to work.

Figure 5:
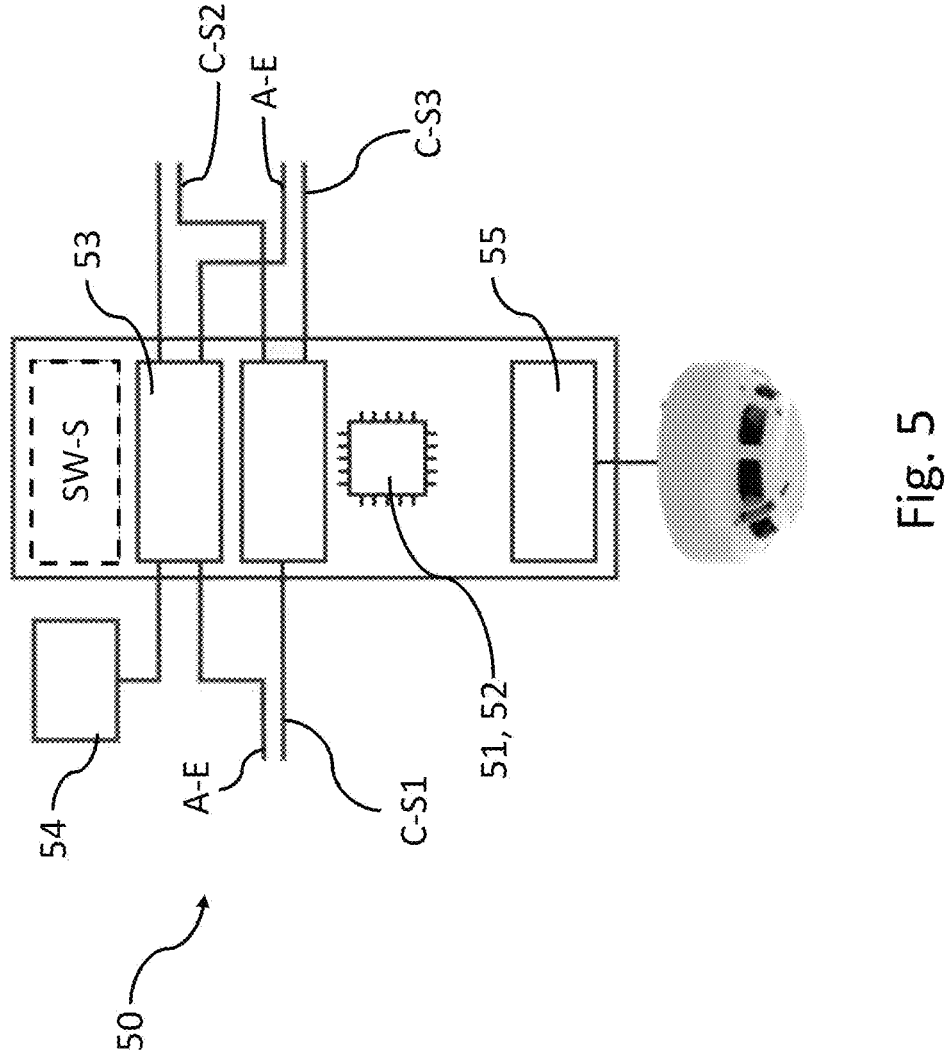
FIG. 5 diagrammatically shows a further component of the system of FIGS. 2a and 2b in accordance with an embodiment.

With reference to FIG. 5, a sensor of the plurality of sensors 50 is now described.

The sensor 50 comprises a data processing module 51, e.g., a microcontroller or microprocessor.

The sensor 50 further comprises at least one memory module 52 operatively connected to the data processing module 51.

It should be noted that the at least one memory module 52 is configured to store one or more program codes executable by the data processing module 51 and the data generated and processed following the execution of said one or more program codes.

The data processing module 51 is configured to execute the operative functions delegated to the sensor 50, as it will be described hereinbelow.

The sensor 50 further comprises an electrical supply management module 53 adapted to receive the electrical supply A-E as input and to transfer the electrical supply A-E as output.

The sensor 50 further comprises a backup battery 54 operatively connected to the electrical supply management module 53.

The electrical supply management module 53 is configured to power the sensor 50, ensuring a minimal functionality within the system 100, by means of the backup battery 54 if problems are encountered with the electrical supply A-E.

The sensor 50 further comprises a detection module 55 operatively connected to the data processing module 51.

For example, the detection module 55 may be a presence detector, a smoke detector, a temperature detector, a water detector, a gas detector, a thermal camera, and so on.

The data processing module 51 of the sensor 50 is configured to perform multiple functions, including: collecting environmental data, communicating data to the at least one remote central electronic computer 20 and so on.

In accordance with an embodiment, in combination with any of the preceding ones, each sensor of the plurality of sensors 50 is configured to establish a first (main) connection in a wired mode and a second (secondary) connection in a wireless mode by a mesh network mechanism with the electronic apparatuses of the first plurality 40 of electronic apparatuses and the sensors or other sensor nodes (described hereinbelow) of the plurality of sensors 50, directly connected thereto by a respective wired connection backbone cable.

A mesh network has been described above.

In accordance with a further embodiment, in combination with any one of those described above, each sensor of the plurality of sensors 50 is configured to allow a connection and a configuration of the plug-and-play type within the system 100.

In accordance with an embodiment, in combination with any one of those described above, shown with dashed lines in FIG. 5, the sensor 50 may further comprise a network switching module SW-S configured to enable the sensor 50 to be in communication with the electronic apparatus 40 connected upstream and the one or more sensors connected downstream.

In accordance with an embodiment, in combination with any one of those described above, it should be noted that, for the connection of a tree network topology, each sensor of the plurality of sensors 50 comprises an input connection to receive a respective connection cable C-S1 and two output connections from each of which a respective further connection cable departs, indicated in FIG. 5 with C-S2 and C-S3, for connection of other sensors.

Figure 6:
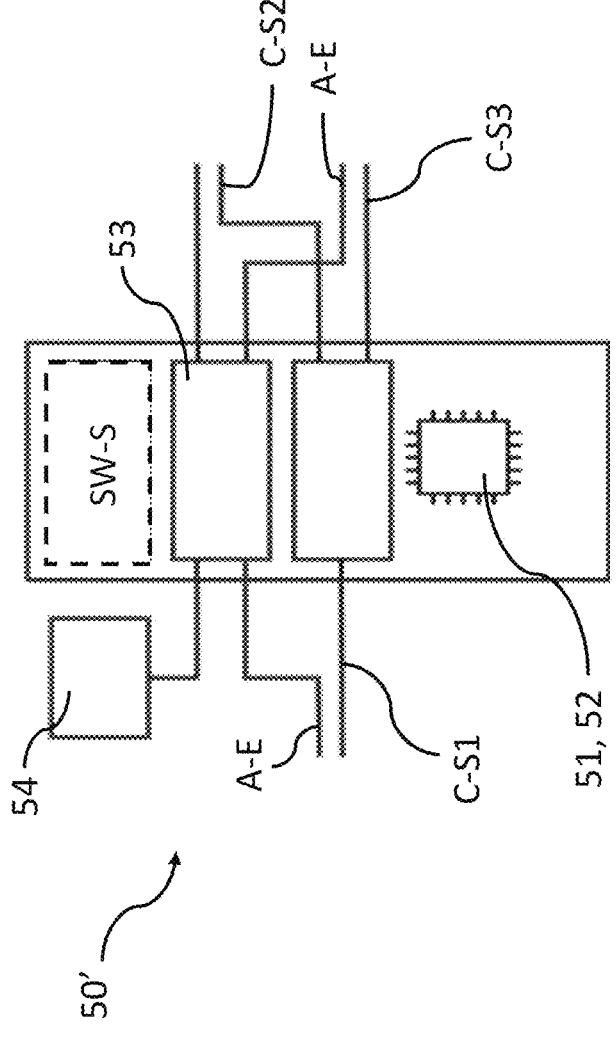
FIG. 6 diagrammatically shows a further component of the system of FIGS. 2a and 2b in accordance with a further embodiment.

In accordance with an embodiment, shown in FIG. 6, the plurality of sensors 50 includes a sub-plurality of sensor nodes 50'.

Each sensor node 50' comprises the same components of the sensor 50 described above with reference to different embodiments with the exception of the detection module 55.

In other words, the sensor node 50' does not perform any detection function.

Each sensor node of the sub-plurality of sensor nodes 50' is configured to perform a network node function within the respective tree network topology.

In this respect, the data processing module 51 of the sensor node 50' is configured to perform multiple functions, including: allowing access to data, operating as a switch/router to allow communication, integrating different types of sensors and so on.

In other words, each sensor node of the sub-plurality of sensor nodes 50' is a junction box onto which one or more digital inputs may be connected.

In accordance with a further embodiment, in combination with any one of those described above in which the sub-plurality of sensor nodes 50' is present, each sensor node of the sub-plurality of sensor nodes 50' is configured to allow a connection and a configuration of the plug-and-play type within the system 100.

In accordance with an embodiment, in combination with any of the preceding ones in which the sub-plurality 50' of sensor nodes is present, each sensor node of the sub-plurality 50' of sensor nodes is configured to establish a first (main) connection in a wired mode and a second (secondary) connection in a wireless mode by a mesh network mechanism with the electronic apparatuses of the first plurality 40 of electronic apparatuses and the sensors or other sensor nodes of the plurality of sensors 50, directly connected thereto by a respective wired connection backbone cable.

A mesh network has been described above.

From a software point of view, the electronic apparatus 40 is configured to manage alarms and telemetry within the shipyard.

In greater detail, the electronic apparatus 40 is configured to:

coordinate the activities of collecting the data detected by the plurality of sensors 50 and send these data to the server side, i.e., the side of the at least one remote central electronic computer 20; the data are then made available to the at least one local electronic computer 10 (watchtower operations center);

manage the list of current equipment of the system in terms of sensors;

moreover, for each sensor, it keeps information on the operative status thereof (operating, failure, removed, etc.);

query the sensors available in the system so as to implement the polling loop;

receive indications of an ongoing emergency and forwards the message to the services involved;

collect information on the current equipment of the system and the status of execution;

integrate with sirens to alert the staff of an emergency;

activate pre-recorded messages upon receiving a command from the watchtower operations center; and implement a support for integrating the sensor bus/network in both a wireline mode (Sensor Bus Driver) and a wireless mode (sensor mesh).

Moreover, it should be noted that the electronic apparatus 40, and in general the system 100, relies on libraries including the Message Queue Telemetry Transport (MQTT) library used for communication.

Such a library implements communication primitives which are used by the service to send/receive messages to/from the web application of the watchtower operations center.

From a software point of view, the electronic apparatus 40 is configured to read data from the plurality of sensors 50 and to notify such data to the at least one remote central electronic computer 20 and to the at least one local electronic computer 10 (watchtower operations center).

Moreover, the electronic apparatus 40 is configured to request, at regular times, a list of sensors available in the system (including sensor type and address).

The list may in fact vary following maintenance activities integrating/removing sensors.

The list is then used to query all the sensors one by one.

The data collected from all sensors include readings taken and the notification of sensors which were unable to respond within a specified time-out.

This information is suitably encoded (e.g., in JSON) and is sent server-side to the event subscribers by means of the MQTT library.

Finally, the electronic apparatus 40 is configured to notify the sensors which have not been capable of responding within a configurable time-out.

If a sensor is unable to respond within the communication time-out for a defined number of subsequent requests, the electronic apparatus 40 suspects that such a sensor is failing.

In this case, the sensor is "flagged" as failing and the event can be notified to the at least one local electronic computer 10 (watchtower operations center).

The electronic apparatus 40 is further configured to manage an alarm notification.

In this respect, an alarm notification is published on an appropriate feed by the web application serving watchtower operators.

The alarm notification is triggered manually by the operators as they recognize a dangerous situation.

When the alarm is notified by means of the MQTT library, the electronic apparatus 40 receives the data, logs-in locally to keep track of what has occurred for a possible future analysis of the accident, switches on the emergency light and possibly emits a sound alarm, at the maximum possible volume, with the horns supplied.

Finally, the electronic apparatus 40 keeps track of the current emergency status.

A similar process is followed to silence an alarm when the emergency is over.

Also in this case, a message is received from the web application of the watchtower operations center.

Upon receiving the message, the electronic apparatus 40 turns off the emergency flashing light and interrupts the sound signals.

Finally, the electronic apparatus 40 updates the status to highlight the return to a normal situation.

When playing a pre-recorded alert message is required, the watchtower operations center notifies with a message, for example MQTT, the electronic apparatuses which specify which recording must be activated.

The notification is triggered manually by operators when a dangerous situation is recognized.

By means of the MQTT library, the alarm is sent to the electronic apparatus 40, which receives the data, logs-in locally to keep track of what has occurred for a possible future analysis of the accident, initiates the recording to use the horns supplied.

The recordings are stored in the electronic apparatus 40 which allows finding an audio file (e.g., in Mp3, Ogg or other formats).

The configuration of the audio files is a configuration parameter of the electronic apparatus 40 which can be modified.

The alarm is preferably set to the maximum possible volume.

Moreover, the electronic apparatus 40 is configured to keep track of the current emergency status.

In addition, the electronic apparatus 40 is configured to detect the presence of a new sensor connected thereto.

In more detail, a sensor, once connected to the electronic apparatus 40, sends a message requesting the recording thereof.

Such a message is repeated at regular times until an acknowledgment message is received.

Once the message has been received, the electronic apparatus 40 logs-in the event locally, replies in turn with a confirmation message, updates the equipment of the electronic apparatus 40 with the information it has received, which include one or more of:

address of the new sensor;
indication of the nature of the sensor (e.g., temperature, smoke, etc.).

The information representative of the availability of the new sensor is then managed by sending, by means of the MQTT library, a notification of the new service at the application level.

After receiving this message, the web application of the watchtower operations center displays the presence of a new sensor, and can carry out the necessary configurations on the application level to position it correctly on the plant of the ship.

It should be noted that this operation can be similarly performed by an operator which works inside the ship using a tablet/smartphone.

The electronic apparatus 40 is further configured to manage the removal of a sensor from the equipment of the electronic apparatus 40, and thus from the list of sensors which must be queried by the system.

In this respect, the electronic apparatus 40 receives a message and eliminates the sensor from the equipment thereof.

Once the sensor has been eliminated from the sensor list, the electronic apparatus 40 will not query such a sensor in future sensing loops.

If the sensor is connected, it is effectively disabled, which is a useful action in the event of failure.

If the sensor has instead been disconnected, the sensing loop is optimized by eliminating the addresses of devices which are no longer part of the sensing infrastructure.

Returning to the functions of the electronic apparatus 40, as already mentioned above, it is configured to detect the presence of an individual on the shipyard (e.g., a firefighter).

In greater detail, the electronic apparatus 40, by means of the wireless communication module MB, with Bluetooth technology, is configured to detect beacons emitted at regular times by a BLTE beacon device wearable by an individual (e.g., a smartwatch).

In fact, each individual is assigned a beacon device which sends a code uniquely identifying the individual.

When the individual approaches the electronic apparatus 40, the beacon is received by the wireless communication module MB, it is displayed and sent to the at least one local electronic computer 10 (watchtower operations center).

The availability of this information is an important element for controlling the methods with which the inspections are carried out and is functional for the preparation of coordination activities in the event of emergencies.

Again with reference to the functions of the electronic apparatus 40, it is possible that the at least one local electronic computer 10 (watchtower operations center) requires one or more electronic apparatuses of the first plurality 40 of electronic apparatuses to reproduce pre-recorded audio messages, e.g., in mp3/Ogg audio format.

In this respect, each electronic apparatus of the first plurality 40 of electronic apparatuses is configured, before installation in the shipyard or after the installation, to store an established set of voice messages in the respective memory unit.

When it is necessary to play a pre-recorded voice message, an operator working in the watchtower, by means of a specific web application loaded on at least one local electronic computer 10, allows selecting the voice message to be played.

Once the pre-recorded voice message has been selected, a code (or alternatively a name of the file to be played) is sent to all, or to an interested part of, the electronic apparatuses of the first plurality 40 of electronic apparatuses, which, upon receiving the request to play the pre-recorded voice message, start playing the pre-recorded voice message using the inner horn H-1 and/or the outer horn H-2.

Again with reference to the functions of the electronic apparatus 40, it is configured to provide audio streaming towards all the electronic apparatuses of the first plurality 40 of electronic apparatuses.

It is thus possible to communicate in sound a pre-recorded voice message of the watchtower staff to be broadcast by the horns of all the electronic apparatuses of the first plurality 40 of electronic apparatuses.

To this end, by means of a web application available to a watchtower operator, installed on the at least one local electronic computer 10 or another electronic device, it is possible to coordinate with an audio streaming service which operates at the server-side infrastructure level, therefore on the side of the at least one remote central electronic computer 20, which is responsible for collecting the audio streaming and forwarding it live to the electronic apparatuses of the first plurality 40 of electronic apparatuses which are involved.

Once the electronic apparatus starts receiving the audio streaming, it immediately activates for playing on the respective horns (the inner horn H-1 and/or the outer horn H-2).

Again with reference to the functions of the electronic apparatus of the first plurality 40 of electronic apparatuses, it is possible to carry out an emergency communication.

In greater detail, an "intercom" communication between the watchtower and the electronic apparatus is allowed.

This "intercom" communication is preferably "full-duplex", thus allowing a simultaneous interaction between the two communicating entities.

This is a significant improvement with respect to existing systems which only allow for a "half-duplex" voice communication in which the communicating entities must alternate in communicating.

It should be noted that the communication can be initiated by either an electronic apparatus of the first plurality 40 of electronic apparatuses or at least one local electronic computer 10 (watchtower operations center).

In any case, the communication may be managed in an "early streaming" mode, i.e., once one of the two entities which intends to communicate has initiated the communication, the communication is immediately enabled, starting without the need for one of the two entities explicitly accepting the communication.

This operating mode is completely the same as that of an intercom/entryphone, rather than that of a telephone, thus allowing an easier communication in case of urgency or emergency.

It should be noted that the communication can be initiated by an electronic apparatus of the first plurality 40 of electronic apparatuses by pressing the respective emergency button PS, effectively initiating a voice communication session with the watchtower.

Similarly, the communication may also be initiated from the watchtower, specifying the electronic apparatus of the first plurality 40 of electronic apparatuses with which to communicate.

In this respect, the web application allows an operator to identify an electronic apparatus of the first plurality 40 of electronic apparatuses and to activate a call.

From a logical point of view, the system 100 is organized as follows and comprises the following logical layers:

basic services of the system 100;
    message management services;
    VoIP management services;
    front-end and application administration of the system services;
    risk intelligence services.

As for the basic services of the system 100, the system 100 includes dynamic IP configuration protocol services (Dynamic Host Configuration Protocol—DHC) for configuring the network configuration of the electronic apparatuses of the first plurality 40 of electronic apparatuses.

In particular, a dynamic addressing model can be used to simplify infrastructure management. Identifiers managed at the application level allow, for example, uniquely identifying an electronic apparatus of the first plurality 40 of electronic apparatuses, even if this were to change IP address over time.

Moreover, the system 100 can use an internal DNS (Domain Name System) to define service URLs in a flexible manner.

The electronic apparatuses of the first plurality 40 of electronic apparatuses do not in fact need to interact with the outside, but an appropriate management of the names allows simplifying the management/maintenance of the services.

Moreover, it is advisable to synchronize the clock of the different electronic apparatuses of the first plurality 40 of electronic apparatuses, so as to have logs which can be more easily reconciled (Network Time Protocol, NTP, service).

In addition, in order to ensure that the system 100 operates continuously over time it is necessary to provide a monitoring service.

In particular, the system 100 can use different protocols to determine the reachability of the electronic apparatuses of the first plurality 40 of electronic apparatuses (Internet Control Message Protocol—ICMP), to verify different operating parameters of the systems (Simple Network Management Protocol—SNMP), and to perform application level controls.

Moreover, in order to allow the correct operation of the access points, the system 100 is configured to manage user authentication by means of authentication protocols such as 802.1X protocol.

As for the message management service, the system 100 is configured to manage MQTT messages using an off-the-shelf broker.

As for the VoIP management service, the system 100 is configured to manage voice broadcasting by means of the SIP protocol, for both unicast management (emergency calls) and broadcast management.

As for the service of front-end and application administration of the system 100, the at least one local electronic computer 10 (watchtower operations center) is managed by means of a web application.

Web application access is controlled by an Active Directory instance that is synchronized with the plant-level authentication service. This ensures the possibility for the system to continue operating even in the event of malfunctions/interruption of the IT system services.

The web application is integral with the data collection system by means of a database.

Sending of messages to the electronic apparatuses of the first plurality 40 of electronic apparatuses is carried out directly by interaction between the server-side system and the MQTT broker, and without further management elements.

As for the risk intelligence services, the system 100 is configured to collect data from the system using an Extract, Transform, and Load tool (ETL).

Examples of data of interest are:
    alarms detected by the sensors;
    alarm silencing activities;
    system update activities; and
    system faults and malfunctions.

The system 100 is configured to consolidate these data on a database which will allow structuring and processing them so as to simplify the use of the information.

It should be noted that the whole management of the data collection and the processing of the views and the user interest indicators will have to be carried out at the cloud infrastructure/site data center level. This is to prevent the computational load resulting from the need to implement complex queries required for business intelligence from having impacts on the ordinary operation of the solution.

As for the access to business intelligence services as well, an appropriate management of the accesses must be considered, which limits the visibility of the data only to the operators who actually need them to carry out the work tasks thereof.

In fact, risk intelligence information is extremely sensitive from a business point of view and can be exploited by anyone who, for any reason, intends to sabotage the work of the shipyard, thus endangering the safety of the workers and the integrity of the products.

With general reference to the system 100, in order to obtain a correct operation, a coordination between the at least one local electronic computer 10, thus also the at least one remote central electronic computer 20 and the first plurality 40 of electronic apparatuses is essential.

Instead, as for the coordination between the at least one local electronic computer 10 (and the at least one remote central electronic computer 20) and the first plurality 40 of electronic apparatuses, the system 100 is generally configured to:

collect and distribute events from/to a multiplicity of electronic apparatuses of the first plurality 40 of electronic apparatuses;

allow voice communication;

allow real-time audio communication; and provide support for authenticating different classes of users with differentiated levels of access to information.

On the server side, the system 100 further requires to:

operate while ensuring high levels of reliability of the solution; and allow the most common remote management operations of the entire system.

As for collecting and distributing events, the system 100 is based on the so-called publish/subscribe model.

Such a model establishes that the system 100 comprises:

a message broker; and a publish/subscribe system client.

The broker is a server that receives all the messages from the clients and then routes them to the relevant destination clients.

A client is anything that can interact with the broker to send and receive messages.

In order to communicate, the client connects to the broker.

The messages are not addressed to specific recipients but are published under "topics".

A client can subscribe to any "topic" in the broker.

In the model to be used in the system 100, it is assumed that the connection is encrypted and operates on the TSL protocol.

The communication essentially occurs as follows:

a client publishes the messages under a topic by sending the message and topic to the broker; and the broker then forwards the message to all clients who are subscribed to that topic.

Since messages are organized by topics, the web application developer has the flexibility to specify that certain clients can only interact with certain messages.

For example, the electronic apparatuses of the first plurality 40 of electronic apparatuses will publish the readings thereof under the "sensor-data" topic and will subscribe to the "config-change" topic.

Conversely, the watchtower application will subscribe to the "sensor-data" topic and will publish any updates of the setup of the electronic apparatus of the first plurality 40 of electronic apparatuses under "config-change".

In accordance with an embodiment, the publish/subscribe model is based on the MQTT library.

For voice communication, audio intercom/broadcast sessions are initiated using a Session Initiation Protocol (SIP), which describes how to initiate Internet telephone calls and other multimedia connections.

The SIP protocol can establish communication sessions of various types, including:

communication between two parties (ordinary telephone calls);

multi-party communication (where everyone can listen and speak); and multicast communication (one sender, many recipients).

The SIP protocol does not establish the content of the communication sessions but merely provides support for setting up, managing and closing sessions.

Other protocols, such as RTP/RTCP, are also used for data transport.

In accordance with the present invention, the content of the transmissions is a digital audio required for the communication between the parties.

In the system 100 of the present invention, the SIP protocol is used for implementing intercom and broadcasting voice communications with all the electronic apparatuses of the first plurality 40 of electronic apparatuses.

Once the connection request has been received, the call will be immediately confirmed at the application level, thus allowing the communication to be initiated immediately, without the need for confirmations/interactions by the operators.

As for the intercom function, the SIP communication will use the communication between two parties, while in the case of broadcast communication to all the electronic apparatuses of the first plurality 40 of electronic apparatuses the multicast mode will be used.

As for real-time audio communication, a Real-time Transport Protocol (RTP) and an RTCP protocol are used, which are dedicated to the real-time transport of multimedia contents and to streaming control, respectively.

As for the authentication support, access to the system management application must be limited to a few controlled operators.

Depending on the profile and needs when accessing the system, it is necessary to authenticate the user.

Since the spaces of the watchtower operations center are not segregated, and since there are different operators who can operate within a session, it is necessary to provide a second level of authentication also for logged-in users.

In this sense, the unlocking of critical functions for the system, such as the possibility of silencing alarms, for example, is allowed only upon a secondary authentication.

The secondary authentication mode may involve the use of an RFID/NFC badge, for example.

The decision to use the badge is consistent with the application scenario and does not have excessive impacts on the daily operations of the operators.

It should be noted that the user authentication is also required for accessing the Wi-Fi network.

In particular, the system will rely on the solutions used on the shipyard which adopt an authentication protocol called RADIUS, for example.

As for the configuration of the system 100, as previously mentioned, both each electronic apparatus of the first plurality 40 of electronic apparatuses and each sensor (or sensor node) is configured according to a logic of the plug-and-play type.

In greater detail, the configuration of an electronic apparatus of the first plurality 40 of electronic apparatuses does not require particular warnings or manual configurations.

Should changes occur in the URLs of the services and whenever it is necessary to renew the digital certificates, the system 100 allows remotely updating the configuration of the electronic apparatuses of the first plurality 40 of electronic apparatuses using the MQTT protocol.

When an electronic apparatus of the first plurality 40 of electronic apparatuses is removed from the system 100, the at least one local electronic computer 10 (watchtower operations center) detects that it is no longer available.

However, in order to distinguish between faults and maintenance activities, in the case of removal of an electronic apparatus of the first plurality 40 of electronic apparatuses, an application configuration activity is necessary to remove the controls associated therewith.

As for the configuration of the sensors, when a new sensor is inserted into the system 100, it must be able to be immediately recognized by the system 100 without the need for significant technical interventions by the staff involved in the installation.

The recognition must include the address of the sensor, together with information regarding the nature of the sensor itself.

However, it is necessary for the operator to define the precise physical location of the sensor on a map. This can be done using the web application which is used by the at least one local electronic computer 10 (watchtower operations center), or by operating with a web application, by means of a mobile terminal such as a smartphone or tablet.

When a sensor is removed from the system 100 the electronic apparatus of the first plurality 40 of electronic apparatuses detects that a sensor is no longer available.

However, in order to autonomously distinguish the case of a fault (e.g., damage to the sensor or the cable connecting it) from the desire of a technician to remove the sensor (e.g., to replace a sensor that requires maintenance), the electronic apparatus of the first plurality 40 of electronic apparatuses, in the case of removal of a sensor, expects to receive a message from the web application specifying that the indicated sensor is no longer part of the equipment of the system 100.

An unreachable sensor is thus removed from the electronic apparatus of the first plurality 40 of electronic apparatuses and is no longer queried in the polling cycles.

Moreover, in order to allow the recognition of a new sensor, it is necessary that the bus/network connecting the sensors implements a broadcast mechanism which allows the new sensor to send advertisements about the online availability thereof.

Conversely, it is possible to ensure that the electronic apparatuses of the first plurality 40 of electronic apparatuses have a fixed address/identifier and that, as soon as they are turned on, all the sensors are logged to that address.

As for the logging of operations, all changes in the status of the system 100, all management operations, all activities carried out by the operators, must be logged on the server.

This requirement arises from the need to precisely analyze what happened and to precisely reconstruct the events in case of an accident.

With the need to "log" all operations, the need to attribute them to the different operators is also highlighted. This requires:

identifying the most appropriate mechanisms for operator authentication; and integrating the authentication mechanism with existing company tools and policies.

For example, the possibility of using a badge to recognize who has carried out the main operations (e.g., silencing alarms) is provided.

In fact, the spaces of the watchtower operations center are not isolated, and even the personalized access to the system with personal credentials cannot be sufficient to identify with reasonable certainty who has implemented a specific operation.

With reference to FIG. 2*a*, in one embodiment, each electronic apparatus of the first plurality 40 of electronic apparatuses representative of a root node of the respective tree network topology is directly connected to the at least one local electronic computer 10.

The connection of an electronic apparatus of the first plurality 40 of electronic apparatuses with the at least one local electronic computer 10 is a wired connection backbone cable.

Moreover, it should be noted that the connection of an electronic apparatus of the first plurality 40 of electronic apparatuses with the at least one local electronic computer 10 requires wiring long connection backbone cables, for example equal to a few hundred meters.

In this respect, the use of optical fiber allows improving the quality of the connection and obtaining the possibility of having connection backbone cables which extend beyond 100 meters, which is instead the recommended limit if the wired connection is made of UTP copper (that is, an Unshielded Twisted Pair).

In accordance with a further embodiment shown in FIG. 2*b*, as an alternative to the preceding one and in combination with any one of the other embodiments described before the preceding one, the system 100 comprises a second plurality 30 of electronic devices configured to be operatively connected to the watchtower of the ship 1 under construction by means of a wired connection.

The second plurality 30 of devices is distributed along a quay adjacent to the shipyard (ship under construction).

The connection in a wired mode of each electronic device of the second plurality 30 of electronic devices and the watchtower of the ship 1 under construction is a wired connection.

Each electronic device of the second plurality 30 of electronic devices is configured to operate as a router or network switch.

Each electronic device of the second plurality 30 of electronic devices is operatively connected to at least one local electronic computer 10.

In this embodiment, each electronic apparatus of the first plurality of electronic apparatuses 40 representative of a root node of the respective tree network topology is operatively connected to the at least one local electronic computer 10 by an electronic device of the second plurality 30 of electronic devices.

In this embodiment, each electronic device of the second plurality 30 of electronic devices can be referred to as a "first level" electronic device while each electronic apparatus of the first plurality 40 of electronic apparatuses can be referred to as a "second level" electronic apparatus.

In this respect, each electronic device of the second plurality 30 of electronic devices is not configured to perform functions of application interest.

Each electronic device of the second plurality 30 of electronic devices is in fact configured to meet the needs of simplifying and streamlining the connection between the watchtower of the ship 1 and the so-called "second level"

electronic apparatuses (electronic apparatuses of the first plurality 40 of electronic apparatuses) which are instead configured to implement functions of interest for the operating scenario of the system 100.

The connection of an electronic device of the second plurality 30 of electronic devices with the at least one local electronic computer 10 is a wired connection backbone cable.

Moreover, it should be noted that the connection of an electronic device of the second plurality 30 of electronic devices with the at least one local electronic computer 10 requires to wire long connection backbone cables, for example equal to a few hundred meters.

In this respect, the use of optical fiber allows improving the quality of the connection and obtaining the possibility of having connection backbone cables which extend beyond 100 meters, which is instead the recommended limit if the wired connection is made of UTP copper (that is, an Unshielded Twisted Pair).

Figure 7B:
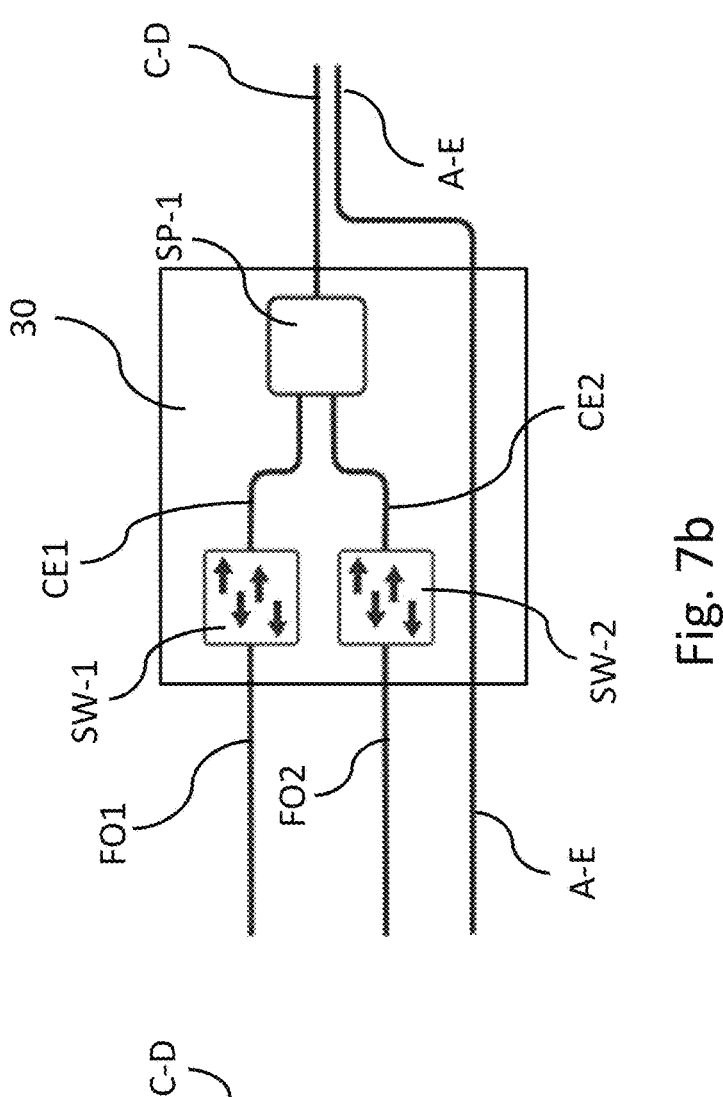
FIGS. 7a and 7b diagrammatically show a component of the system of FIG. 2b according to different embodiments.
Figure 7A:
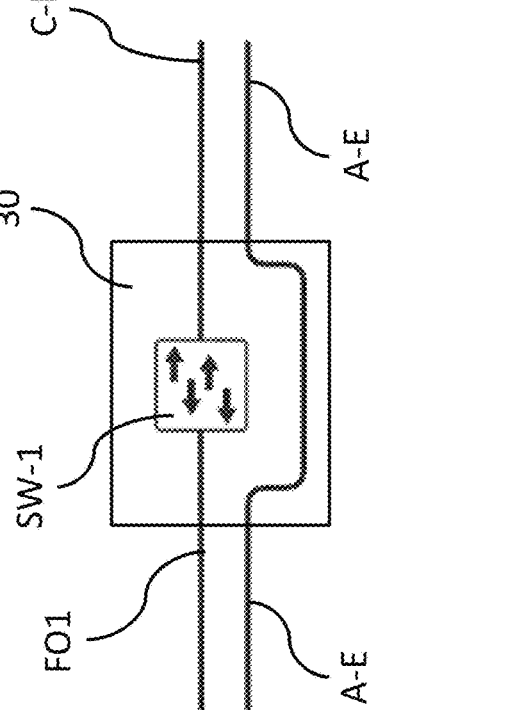

Now also referring to FIGS. 7a and 7b, an electronic device of the second plurality 30 of electronic devices is described in accordance with different embodiments.

The electronic device 30 is configured to receive an optical fiber FO1 (FIG. 7a) or two optical fibers FO1 and FO2 (FIG. 7b) and the electrical supply A-E of the system 100 as input, and to bring an ethernet connection backbone cable (e.g., made of UTP copper) C-D as output.

In one embodiment, each electronic device of the second plurality 30 of electronic devices is directly connected to the at least one local electronic computer 10.

In a further embodiment, alternative to the preceding one, the electronic device, among all the electronic devices of the second plurality 30 of electronic devices, closest to the at least one local electronic computer 10 is directly connected to the at least one local electronic computer 10.

In this embodiment, starting from the electronic device closest to the at least one local electronic computer 10, the electronic devices of the second plurality 30 of electronic devices are connected to one another in cascade (i.e., in a daisy-chain mode).

In accordance with an embodiment, shown in FIG. 7a, the electronic device comprises a router or network switch SW-1 adapted to receive an optical fiber FO1 as input, and to bring an ethernet connection backbone cable C-D as output, in addition to the electrical supply A-E received as input.

In accordance with a further embodiment, shown in FIG. 7b, the electronic device 30 comprises:

a first router or network switch SW-1 adapted to receive a first optical fiber FO1 as input and to bring a first ethernet connection (copper) CE1 as output;

a second router or network switch SW-2 adapted to receive a second optical fiber FO2 as input and to bring a second ethernet connection (copper) CE2 as output; and a splitter SP-1 adapted to receive the first ethernet connection CE1 and the second ethernet connection CE2 as input, and to bring a connection backbone cable C-D as output.

The electronic device 30 is also adapted to output the electrical supply A-E received as input.

Now also referring to the block diagram of FIG. 8, a method 800 is now described for supporting activities in a shipyard during the construction of a ship, hereinafter also simply support method or method.

It should be noted that the components and information mentioned below with the description of the method have already been described previously with reference to the system 100 and will thus not be repeated for brevity.

The method 800 comprises a symbolic step of starting ST.

The method 800 further comprises a step of providing 801 at least one local computer 10 configured to be operatively installed in the watchtower of the ship 1.

The at least one local electronic computer 10 is configured to be operatively connected to at least one central electronic computer 20 remote from the ship 1.

The method 800 further comprises a step of providing 802 a first plurality 40 of electronic apparatuses operatively connected by respective wired connection backbone cables to form one or more tree network topologies, in which each electronic apparatus of the first plurality 40 of electronic apparatuses representative of a root node of the respective tree network topology is operatively connected to the at least one local electronic computer 10.

The method 800 further comprises a step of detecting 803, by a plurality of sensors 50 distributed in the shipyard, information representative of the shipyard 1 (previously defined).

The plurality of sensors 50 is operatively connected by respective wired connection cables to the first plurality 40 of electronic apparatuses to form one or more network topologies from one or more electronic apparatuses of the first plurality 40 of electronic apparatuses.

The method 800 further comprises a step of managing 804, by each electronic apparatus of the first plurality 40 of electronic apparatuses, network connectivity and safety of the shipyard based on the information representative of the shipyard detected by the plurality of sensors 50.

The method further comprises a symbolic step of ending ED.

Figure 8:
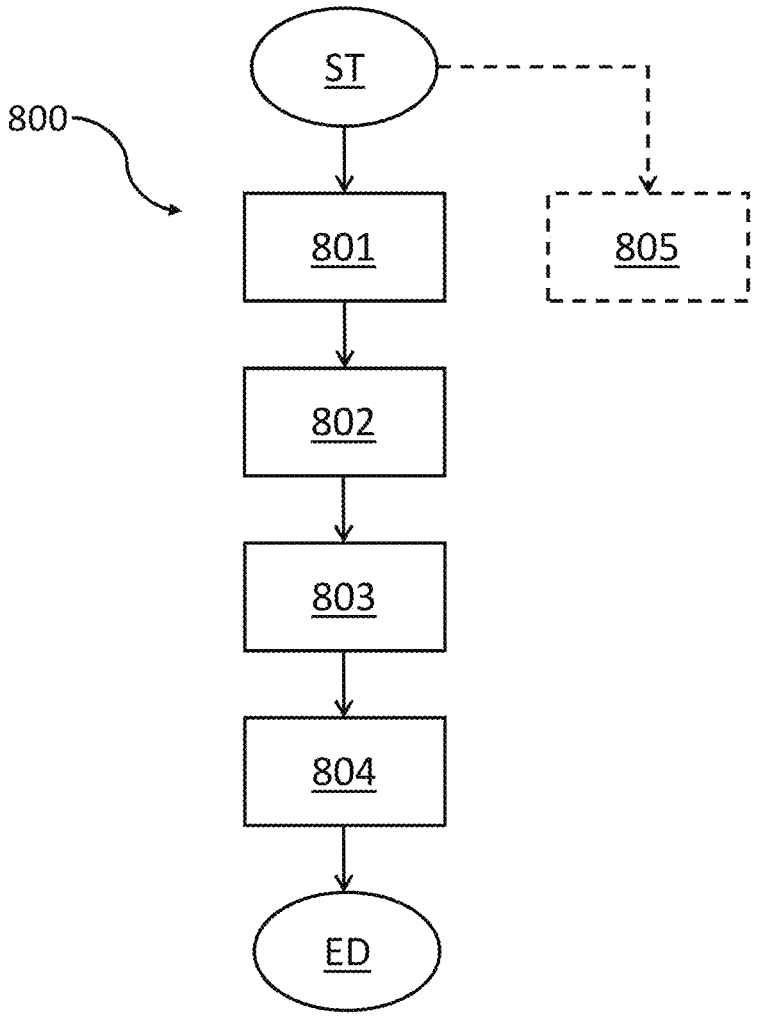
FIG. 8 shows, by means of a block diagram, a method for supporting activities in a shipyard during the construction of a ship according to an embodiment of the present invention.

In accordance with an embodiment, shown with dashed lines in FIG. 8, the method 800 further comprises a step of providing 805 a second plurality 30 of electronic devices operatively connected to the watchtower of the ship 1 under construction by means of a wired connection.

The second plurality 30 of electronic devices is distributed along a quay adjacent to the shipyard.

The connection in a wired mode of each electronic device of the second plurality 30 of electronic devices and the watchtower of the ship 1 under construction is a wired connection.

Each electronic device of the second plurality 30 of electronic devices is configured to operate as a router or network switch.

Each electronic device of the second plurality 30 of electronic devices is operatively connected to at least one local electronic computer 10.

Other steps of the method, according to different embodiments, can correspond to different functions of the system 100 previously described according to different embodiments of the system 100.

As it can be seen, the object of the present invention is fully achieved since the system and the related method for supporting activities in a shipyard during the construction of a ship have several advantages, some of which have already been stated above.

In fact, the system 100 is capable of overcoming the constraints and rigidities of the systems and allows new needs to be followed, ensuring flexibility of use and ease of maintenance of the infrastructure for the long term, and improving various aspects of safety starting with the prevention of accidents.

In greater detail, the system of the present invention is capable of detecting fires, floods or other critical situations.

This advantageously allows significantly increasing the level of safety at work while protecting the integrity of the production.

The system of the present invention is advantageously mobile and dynamic.

In fact, as the ship is built, new components (electronic devices, sensors, sensor nodes) can be added to the monitoring system.

With the progress of production activities, the system is then combined with the fire prevention system of the ship, where available, to which the accident prevention role is gradually handed over in the final product setup steps.

The main functions which the system of the present invention is required are:

reading and forwarding to the watchtower operations center the data detected by the environmental sensors;

push-to-talk communication between an electronic apparatus of the first plurality 40 of electronic apparatuses and the watchtower;

broadcast audio communication to all the electronic apparatuses of the first plurality 40 of electronic apparatuses which are positioned on the shipyard and/or on the ship;

collection and display of alarms; and an extremely simple configuration (ideally, plug-and-play) of the electronic apparatuses of the first plurality 40 of electronic apparatuses, of the sensors and of the sensor nodes.

Moreover, the system of the present invention advantageously allows integrating the necessary sensors for detecting fires using temperature sensors and smoke detectors which are usually integrated into commercially available fire prevention solutions, and allows integrating anti-flood sensors which highlight dangerous situations for workers and the production.

Finally, the system of the present invention is sufficiently flexible to integrate over time further environmental sensors that allow, for example, detecting gases which can be produced during some processes, or further elements of danger which can be identified in the years to come.

A further advantage of the system of the present invention is the possibility of improving the wiring connecting the different components of the system.

In fact, during normal shipyard operations, damage to the cables is frequent, significantly complicating the work and the prevention of accidents.

In this respect, the improvement obtained, in addition to a greater flexibility, is also related, where possible, to the lower weight of the wiring, which is currently difficult and tiring to handle and install.

In addition, the system of the present invention, as previously mentioned, advantageously allows detecting the passage of fire brigade patrols which, during daily inspection activities, carry out inspections of the various areas of the shipyard.

The availability of technical solutions capable of detecting fire brigade inspections is a guarantee for the operator, who is thus capable of demonstrating at any time that the different areas of the ship have been correctly inspected.

Moreover, an inspection tracking system can provide important elements to assess whether the number of resources used for inspections is adequate or whether it is necessary to provide additional staff.

Finally, the (even approximate) visibility of the position of the firefighters on the shipyard allows the staff of the watchtower operations center to effectively plan the response in the case of accidents.

The system 100 further allows analyzing all the events occurring within the shipyard, by collecting and monitoring:

emergency situations determined by outbreaks of fires, floods, and so on; and faults and anomalies in the prevention system such as disconnection of sensors, malfunctions, disconnection of entire parts of the system due to the cutting of cables, and so on.

It is thus possible to identify and correct any problems before they affect the production, and it is also possible to identify good system management and configuration practices. In fact, to date, there are no well-established guidelines shared between different shipyards/projects regarding the installation of fire prevention systems, solution installation criteria, or precise criteria for defining the expected performance of the system. Moreover, it is possible to assess whether the service levels of the fire prevention solution are in line with expectations, and where/when these are not met.

Finally, it should be noted that the system of the present invention can be operative even after the launch of the ship.

In fact, it is possible to use the system for managing connectivity even once the ship has been completed.

In this case, the task of the system is no longer related to supporting safety management processes on the shipyard but to the simple provision of wireless connectivity.

Those skilled in the art may make changes and adaptations to the embodiments of the system and method described above or may replace elements with others which are functionally equivalent in order to meet contingent needs without departing from the scope of protection as described and claimed herein. Each of the features described above as belonging to one possible embodiment may be implemented irrespective of the other embodiments described.

What is claimed is:

1. A system for supporting activities in a shipyard during construction of a ship, the system comprising:

at least one local electronic computer configured to be operatively installed in a watchtower of the ship, the at least one local electronic computer being configured to be operatively connected to at least one central electronic computer remote from the ship;

a first plurality of electronic apparatuses operatively connected by respective wired connection backbone cables to form one or more tree network topologies, wherein each electronic apparatus of the first plurality of electronic apparatuses representative of a root node of a respective tree network topology is operatively connected to the at least one local electronic computer; and a plurality of sensors adapted to be distributed in the shipyard to detect information representative of the shipyard, the plurality of sensors being operatively connected by respective wired connection cables to form one or more network topologies from one or more electronic apparatuses of the first plurality of electronic apparatuses, each electronic apparatus of the first plurality of electronic apparatuses being configured to manage network connectivity and safety of the shipyard based on the information representative of the shipyard detected by the plurality of sensors.

2. The system of claim 1, wherein each electronic apparatus of the first plurality of electronic apparatuses is configured to establish a wired connection by a mesh network mechanism with the electronic apparatuses of the first plurality of electronic apparatuses and the sensors of said plurality of sensors, directly connected thereto by the respective wired connection backbone cable.

3. The system of claim 1, wherein each electronic apparatus of the first plurality of electronic apparatuses is configured to allow a connection and a configuration of the plug-and-play type within the system.

4. The system of claim 1, wherein each electronic apparatus of the first plurality of electronic apparatuses comprises an input connection for receiving a respective connection backbone cable and two output connections from each of which a respective further connection backbone cable departs, for connection of other electronic apparatuses of the first plurality of electronic apparatuses.

5. The system of claim 1, wherein an electronic apparatus is configured to detect presence of an individual on the shipyard.

6. The system of claim 5, wherein the electronic apparatus comprises a wireless communication module, with Bluetooth technology, the electronic apparatus being configured to detect beacons emitted at regular times by a BLTE beacon device wearable by an individual sending a code that uniquely identifies the individual.

7. The system of claim 1, wherein each sensor of the plurality of sensors comprises an input connection for receiving a respective connection cable and two output connections from each of which a respective further connection cable departs, for connection of other sensors.

8. The system of claim 1, wherein each sensor of the plurality of sensors is configured to establish a first connection in a wired mode and a second connection in a wireless mode by a mesh network mechanism with the electronic apparatuses of the first plurality of electronic apparatuses and the sensors of the plurality of sensors, directly connected thereto by the respective wired connection backbone cable.

9. The system of claim 1, wherein each sensor of the plurality of sensors is configured to allow a connection and a configuration of a plug-and-play type within the system.

10. The system of claim 1, wherein the plurality of sensors comprises a sub-plurality of sensor nodes, each sensor node of said sub-plurality of sensor nodes being configured to perform a network node function within the respective tree network topology.

11. The system of claim 10, wherein each sensor node of said sub-plurality of sensor nodes is configured to allow a connection and a configuration of a plug-and-play type within the system.

12. The system of claim 10, wherein each sensor node of said sub-plurality of sensor nodes is configured to establish a first connection in a wired mode and a second connection in a wireless mode by a mesh network mechanism with the electronic apparatuses of the first plurality of electronic apparatuses and the sensors or other sensor nodes of the plurality of sensors, directly connected thereto by a respective wired connection backbone cable.

13. The system of claim 1, wherein each electronic apparatus of the first plurality of electronic apparatuses representative of the root node of the respective tree network topology is directly connected to the at least one local electronic computer.

14. The system of claim 1, further comprising a second plurality of electronic devices configured to be operatively connected to the watchtower of the ship under construction by a wired connection, the second plurality of electronic devices being distributed along a quay adjacent to the shipyard, each electronic device of the second plurality of electronic devices being configured to function as a router or network switch, each electronic device of the second plurality of electronic devices being operatively connected to the at least one local electronic computer, each electronic apparatus of the first plurality of electronic apparatuses representative of the root node of the respective tree network topology being operatively connected to the at least one local electronic computer by an electronic device of the second plurality of electronic devices.

15. The system of claim 14, wherein each electronic device of the second plurality of electronic devices is directly connected to the at least one local electronic computer.

16. The system of claim 14, wherein an electronic device, among all the electronic devices of the second plurality of electronic devices, closest to the at least one local electronic computer is directly connected to the at least one local electronic computer, starting from the electronic device closest to the at least one local electronic computer, the electronic devices of the second plurality of electronic devices being connected to one another in cascade.

17. A method for supporting activities in a shipyard during construction of a ship, the method comprising:

providing at least one local electronic computer operatively installed in a watchtower of the ship, the at least one local electronic computer being operatively connected to at least one central electronic computer remote from the ship;

providing a first plurality of electronic apparatuses operatively connected by respective wired connection backbone cables to form one or more tree network topologies, wherein each electronic apparatus of the first plurality of electronic apparatuses representative of a root node of a respective tree network topology is operatively connected to the at least one local electronic computer;

detecting, by a plurality of sensors distributed in the shipyard, information representative of the shipyard, the plurality of sensors being operatively connected by respective wired connection cables to form one or more network topologies from one or more electronic apparatuses of the first plurality of electronic apparatuses; and managing, by each electronic apparatus of the first plurality of electronic apparatuses, network connectivity and safety of the shipyard based on the information representative of the shipyard detected by the plurality of sensors.

* * * * *